United States Patent
Sathya et al.

(10) Patent No.: US 11,551,119 B2
(45) Date of Patent: Jan. 10, 2023

(54) MACHINE LEARNING BASED RANKING OF PRIVATE DISTRIBUTED DATA, MODELS AND COMPUTE RESOURCES

(71) Applicant: S20.ai, Inc., Austin, TX (US)

(72) Inventors: Sai Sri Sathya, Coimbatore (IN); Tabish Imran, Mumbai (IN); Santanu Bhattacharya, Austin, TX (US); Karishnu Poddar, Mumbai (IN)

(73) Assignee: S20.AI, INC., Austin, TX (US)

( * ) Notice: Subject to any disclaimer, the term of this patent is extended or adjusted under 35 U.S.C. 154(b) by 344 days.

(21) Appl. No.: 16/888,654

(22) Filed: May 29, 2020

(65) Prior Publication Data
US 2021/0012225 A1    Jan. 14, 2021

(30) Foreign Application Priority Data
Aug. 29, 2019 (IN) .............................. 201941034842

(51) Int. Cl.
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS
2019/0087475 A1 * 3/2019 Nagey .................. G06F 16/258

FOREIGN PATENT DOCUMENTS
WO    WO-2013126144 A2 * 8/2013 ............. G06Q 50/01

* cited by examiner

*Primary Examiner* — Brian R Peugh
(74) *Attorney, Agent, or Firm* — Hassan Abbas Shakir; Shakir Law PLLC

(57) ABSTRACT

A method for ranking includes the steps of receiving, at least one model from a central server to form at least one model node; training, the at least one model node with at least one data node to generate a trained model; generating, a weight from each of the at least one data node for the trained model; transferring, the weight from the at least one data node to the central server; inferencing, an inference output using the trained model and the data node; determining, an edge between the at least one data node and the model node, wherein the edge is determined depending on the influence of the data node or the model node on each other in generating the trained model and the inference output; determining a score for the data node and the model node based on the edge formed.

9 Claims, 8 Drawing Sheets

MACHINE LEARNING BASED RANKING OF PRIVATE DISTRIBUTED DATA, MODELS AND COMPUTE RESOURCES

FIELD OF THE INVENTION

The present invention relates to the field of ranking of distributed data and machine learning models. More specifically the invention relates to the machine learning based ranking of private distributed data, machine learning models and compute resources.

BACKGROUND OF THE INVENTION

Private enterprise data is currently accessible through data brokers who collect data from different sources and then resell or license it to customers based on a contract.

Access to enterprise data (deep web) and machine learning (ML)/deep learning (DL) models has been difficult due to privacy concerns around sensitive data and further due to data being distributed across the enterprise's resources. With recent advancement in privacy preserving technologies such as Federated Learning, Split Learning, Differential Privacy, Multi-Party Computation, Homomorphic Encryption, etc. sensitive data can now be made available to train machine learning (ML) and/or deep learning (DL) models and run inferences without having to compromise on user privacy as in most cases raw data will never have to leave the premise.

Google's PageRank algorithm describes a method for ranking nodes in a linked database. These nodes are primarily web pages (publicly accessible on the internet) that are linked through citations or references. The same may not be applicable when the nodes are just connected (some nodes in an intranet could be connected to the internet) but not linked through a reference as in the case of webpages.

Hence, there is a need for a method to solve the problem of ranking, searching and improving access to the private enterprise data, models and compute resources that are connected but may not directly linked through the internet as they become available through one or more privacy-friendly technologies.

SUMMARY OF THE INVENTION

According to an embodiment, the present invention discloses a method for ranking. The method includes the steps of receiving at least one model from a central server to form at least one model node; training the at least one model node with at least one data node to generate a trained model; generating a weight from each of the at least one data node for the trained model; transferring, the weight from the at least one data node to the central server; inferencing an inference output using the trained model and the at least one data node; determining an edge between the at least one data node and the model node. The edge is determined depending on the influence of the at least one data node or model node on each other in generating the trained model and the inference output. The method further includes determining a score for the at least one data node and the at least one model node based on the edge formed, wherein the at least one model node is the trained model or an inferenced model.

According to an embodiment, the present invention discloses a system for ranking. The system includes at least one processor; and a memory coupled to the processor having instructions executable by the processors. The processor is operable when executing the instructions to: receive at least one model from a central server to form at least one model node; train the at least one model node with at least one data node to generate a trained model; generate a weight from each of the at least one data node for the trained model; transfer the weight from the at least one data node to the central server; inference an inference output using the trained model and the at least one data node; determine an edge between the at least one data node and the model node. The edge is determined depending on the influence of the at least one data node or model node on each other in generating the trained model and the inference output; and determine a score for the at least one data node and the at least one model node based on the edge formed, wherein the at least one model node is the trained model or an inferenced model.

BRIEF DESCRIPTION OF THE DRAWINGS

The foregoing and other features of embodiments of the present invention will become more apparent from the following detailed description of embodiments when read in conjunction with the accompanying drawings. In the drawings, like reference numerals refer to like elements.

DETAILED DESCRIPTION OF THE INVENTION

In the following detailed description, reference is made to the accompanying drawings that form a part hereof, and in which shown by way of illustration specific embodiments that may be practiced. These embodiments are described in sufficient detail to enable a person skilled in the art to practice the invention, and it is to be understood that other embodiments may be utilized and that logical, mechanical, and other changes may be made within the scope of the embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. The singular forms "a," "an," and "the" include plural references unless the context clearly dictates otherwise. The following detailed description is, therefore, not be taken as limiting the scope of the invention, but instead the invention is to be defined by the appended claims.

Figure 1:
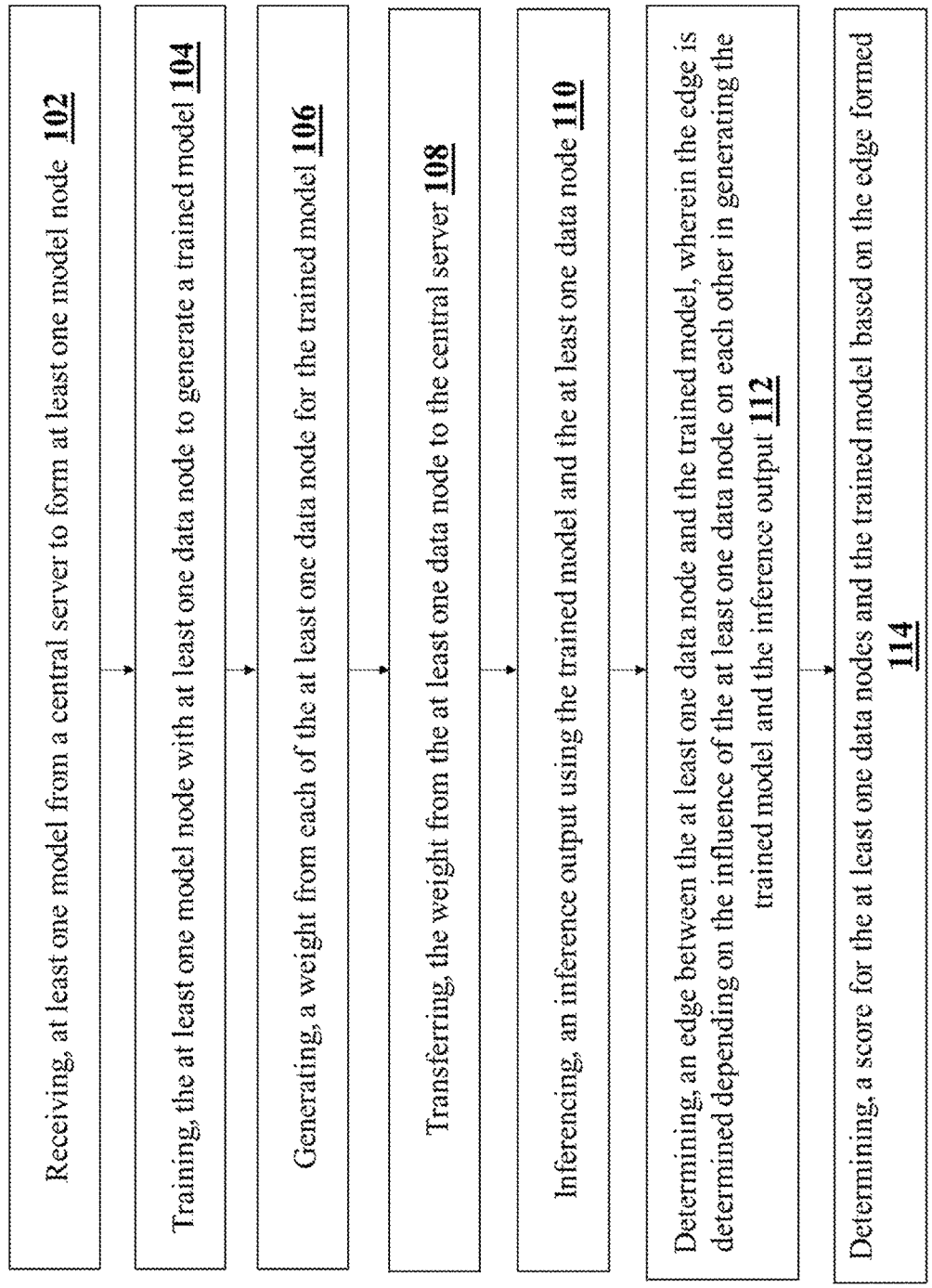
FIG. 1 illustrates the block diagram of a method for ranking, in accordance with an embodiment of the invention.

FIG. 1 illustrates the block diagram of a method for ranking (100), in accordance with an embodiment of the invention. The method (100) includes a step (102) of receiving at least one model from a central server to form at least one model node. The method further includes step (104) of training the at least one model node with at least one data node to generate a trained model. The step (106) includes generating a weight from each of the at least one data node for the trained model. The step (108) transfers the weight from the at least one data node to the central server and a step (110) to inference an inference output using the trained model and the at least one data node. The method further includes a step (112) of determining an edge between the at least one data node and the at least one model node. In one embodiment of the present invention, the edge is determined depending on the influence of the at least one data node or the at least one model node on each other in generating the trained model and the inference output. The method further includes the step (114) of determining a score for the at least one data node and the at least one model node based on the edge formed, wherein the at least one model node is a trained model or inferenced model. Typically, the at least one model node after getting trained and used for inferencing the inference output is the inferenced model.

According to an embodiment of the present invention, the method further includes the step of ranking the at least one data node and the at least one model node based on the score.

According to another embodiment of the present invention, the method further includes the step of generating an aggregated model comprising at least one of the weight of the at least one of the trained model.

In yet another embodiment of the present invention, the score for the at least one data node and the trained model is based on the edge. Typically, the score based on the edge depends on a score factor. According to an embodiment of the present invention, the score factor includes but not limited to at least one of artificial intelligence (AI) readiness, a damping factor, a frequency of usage of the at least one data node or an association to an influential node. According to another embodiment of the present invention, the AI readiness is assigned based on the data node's or model node's individual characteristics such as unlabeled/labeled, clean/transformable, anonymized/encrypted, owner profile, sensitivity/privacy factor, available memory and computing resources, network bandwidth, etc. In yet another embodiment of the present invention, the damping factor is based on context and time could be included to account for newer nodes and edges that may otherwise not receive a high rank. As more models are trained and/or inferenced using the same data node (and in turn creating resulting inference output data node), the score of the model may increase and in turn can have a higher influence over other connected model nodes and data nodes in further rounds. In yet another embodiment of the present invention, some nodes may have fewer edges may have a higher score/rank than the nodes that may have more edges, depending on whether the nodes may be connected to more influential nodes i.e. the nodes with comparatively higher score or nodes may be connected to less influential nodes i.e. nodes with comparatively lower score. Typically, the higher score and lower score is based on the scores present for the various nodes. As used herein the terms "nodes" may include, but are not limited to data node, model node or compute resource node.

According to another embodiment of the present invention, the method further includes the step of scoring at least one compute resource node associated with the at least one model node and the at least one data node based on the score determined for the at least one model node and the at least one data node. Typically, the edge is created between the at least one compute resource node and one or more of at least one data node and the at least one model node.

According to an embodiment of the present invention, the at least one data node may be of different types depending on the type of data. In one embodiment of the present invention, the at least one data node is of a database or a data stream which may include structured data or unstructured data of any data type. Typically, the data node may be either an input to the at least one model node or an input to the trained model. In yet another embodiment of the present invention, the inference output from the trained model is the at least one data node.

In yet another embodiment of the present invention, the at least one data node is of context data. Typically, as used herein the context data may include environment signals that are not direct inputs to the model nodes or to the trained model. In one embodiment of the present invention, the context data is present in the system and is captured and associated with at least one data node or at least one model node or trained model and the edges created between at least one data node or model nodes or trained model.

In yet another embodiment of the present invention, the at least one data node is of a condition data. In one embodiment of the present invention, the condition data may not be a direct input to the at least one model node or to the trained model or context data but is associated with at least one data node or at least one model node and edges. For example, condition data is a business metrics that is used to benchmark model metrics and can act as feedback into ranking system.

According to an embodiment of the present invention, the at least one model node is a machine learning or a deep learning model. In yet another embodiment of the present invention, the at least one model node is of at least one selected from a statistical function or a cryptography or a data processing or a transformation functions. In yet another embodiment of the present invention, the at least one model node is an algorithm or a part of a larger model or an ensemble. According to another embodiment of the present invention, the at least one model node is a reinforced learning agent or similar such artificial intelligence agents.

According to an embodiment of the present invention, the method further includes the step of storing a node log to track the score determined for the at least one data node and the at least one model node. In yet another embodiment of the present invention, the node log captures the details of every edge formed and its relationship between the nodes such as the at least one data node, at least one model node, the trained model or the at least one compute resource node and the edge along with a time stamp. In another embodiment of the present invention, the details captured by the node log is stored in a database in table format or any other suitable format for enabling future scoring in a distributed system and may aid to analyze the distributed learning. These data stored in the node log facilitates scoring the nodes such as the at least one data node, at least one model node, the trained model or the at least one compute resource node locally.

According to an embodiment of the present invention, at least one data node is input to the at least one of the trained model to generate an inference in the inference output data node. The inference output data node may be a direct function of the trained model of the input data node. This creates an influence between the at least one data node and the trained model. In yet another embodiment of the present invention, at least one data node is input to at least one of the model node to train the at least one model node. In one embodiment of the present invention, the at least one of the model node is trained with the input i.e. an edge is generated between at least one data node and at least one of the model node.

According to an embodiment of the present invention, the at least one data node is of type context or of type condition, wherein the data node of context or data node of condition affects at least one data node that is an input data node to the model node. In yet another embodiment of the present invention, the at least one data node of type context and condition affects the at least one compute resource node. In yet another embodiment of the present invention, the at least one data node of type context and condition affects the inference generated.

According to another embodiment of the present invention, the at least one data node is of type condition may be a business requirement which determines the compute resource node for a particular model node. In yet another embodiment of the present invention, the at least one data node is of type context. The at least one data node of type context represents data regarding limited memory that affects the nature and size of the at least one model for a task.

According to another embodiment of the present invention, the at least one data node participates in federated learning or other similar distributed training methods. In one embodiment of the present invention, the participation of the at least one data node may directly affect each other in each round of federated learning determined by the weights assigned to each of the at least one data node's update during the weighted aggregation step.

According to another embodiment of the present invention, the type of data transferred between the various nodes over the edges are model weights and biases, raw data, encrypted or anonymized or transformed data, meta-data, etc.

Figure 2:
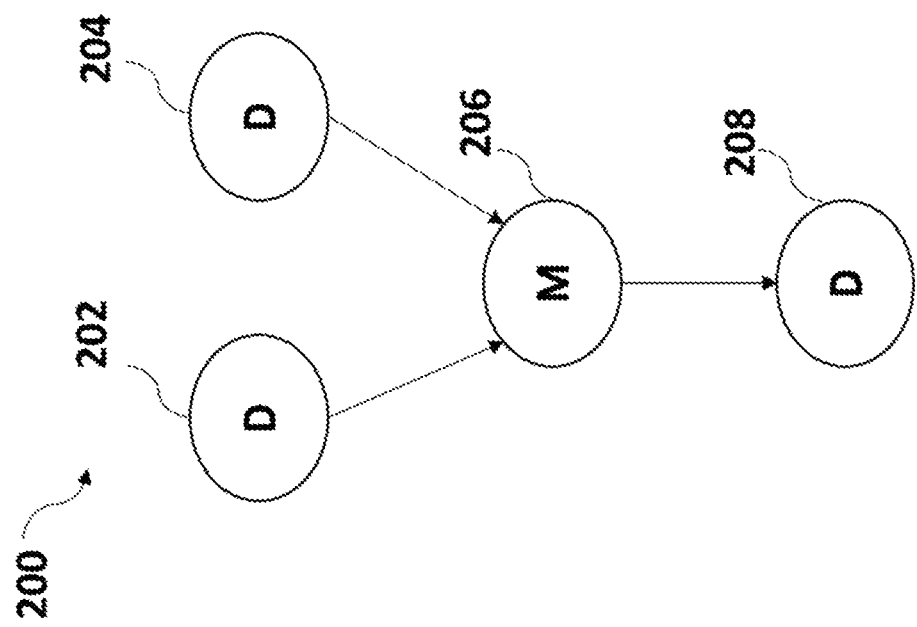
FIG. 2 illustrates an exemplary network of data nodes and model nodes, in accordance to an embodiment of the invention.

FIG. 2 illustrates an exemplary network (200) of the at least one data node and the at least one model node, in accordance to an embodiment of the invention. As depicted here in FIG. 2, two data nodes (202) and (204) are input to a model node (206) and results in the inference to generate inference output data node (208) which is a direct function or influence of the data node (202) and the data node (204).

Figure 3:
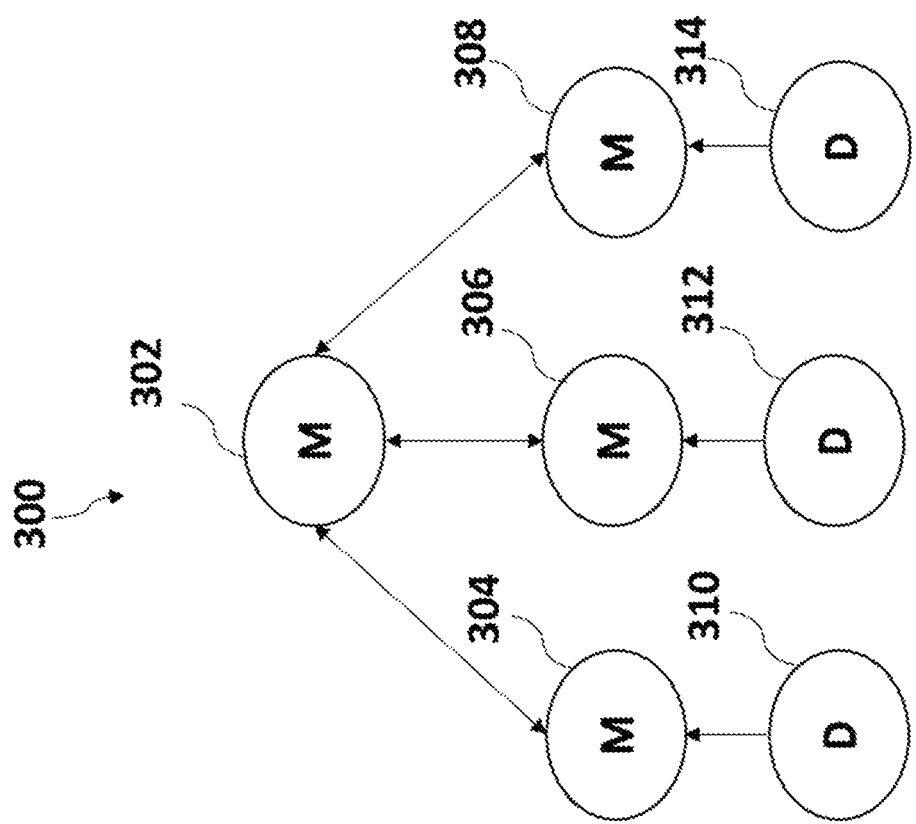
FIG. 3 illustrates an exemplary network of data nodes and model nodes in a federated machine-learning model, in accordance with an embodiment of the invention.

FIG. 3 illustrates an exemplary network (300) of data nodes and model nodes in a federated machine-learning model, in accordance with an embodiment of the invention. As shown herein, a model node (302) gets trained with three separate data sets which may be at three separate locations to generate three separate model nodes (304), (306) and (308), wherein the model node (304) gets trained with the data node (310), the model node (306) gets trained with the data node (312) and the model node (308) gets trained with the data node (314). The weight generated by each of the model node (306, 308 and 310) is transferred to the model node (302) to generate aggregated model node by updating the weight of the model (302).

According to another embodiment of the present invention, an edge of type loops may be created where an edge is a part of a set of edges finally influencing the node, which is started creating the edges, and acts as source node.

According to another embodiment of the present invention, a bridge is created where an edge only connects the at least one data node that is an output of the at least one model node directly to another of the at least one model node as an input.

Figure 4:
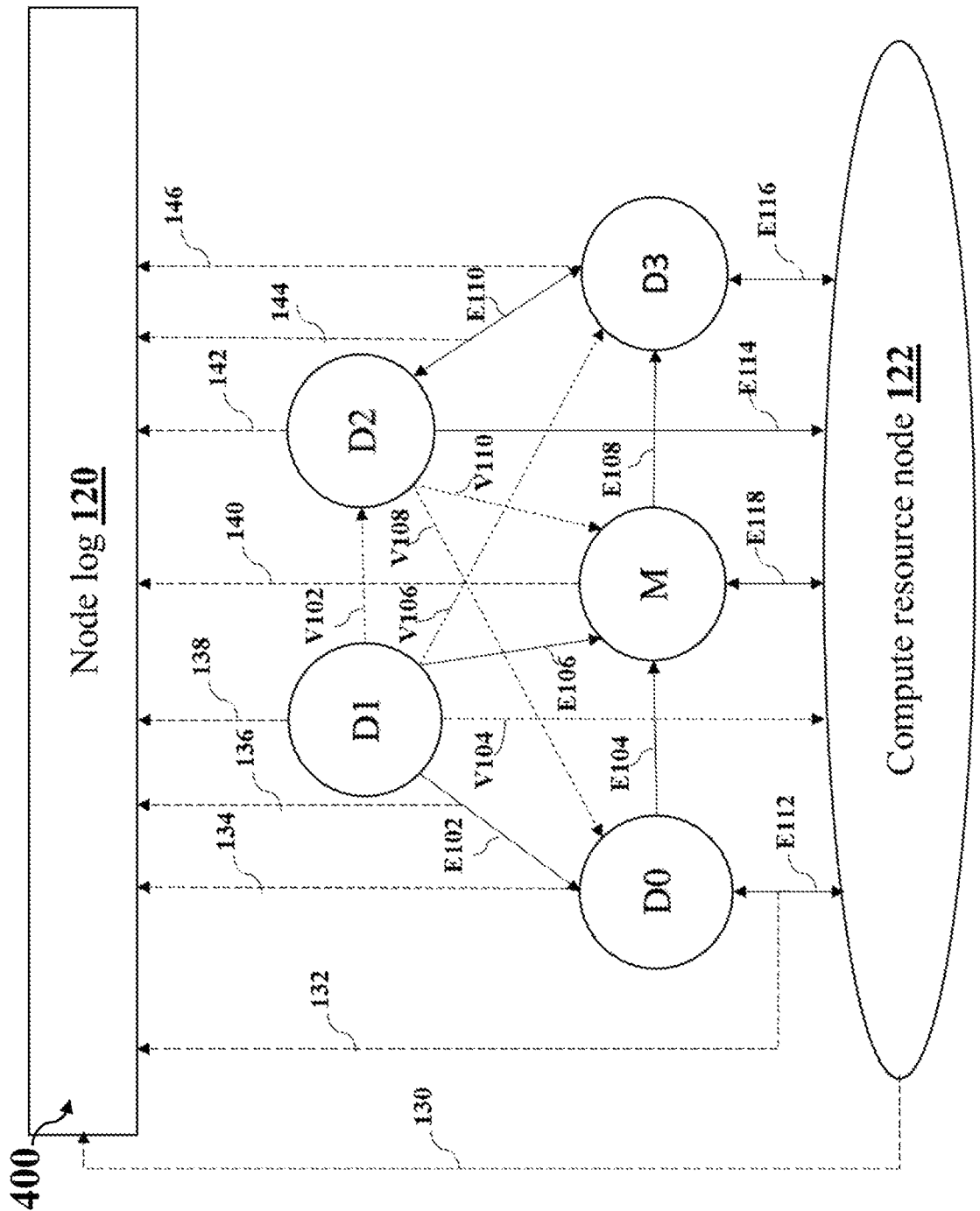
FIG. 4 illustrates an exemplary network of different nodes in accordance to an embodiment of the invention.

FIG. 4 illustrates an exemplary network (400) of different nodes such as the at least one data node, the at least one model node, the compute resource node, the edges and the node log, in accordance with an embodiment of the invention. The at least one data node D0 is an input data node to the at least one model node M. The at least one data node of type context D1 (also referred to as "context data node D1") directly influenced the selection of the at least one data node D0 and results in the creation of edge E102. The at least one model node M processes the input from the at least one data node D0 along with the context data node D1 to generate the at least one data node D3 as inference output (also referred to as "output data node D3") and results in the creation of edges E104, E106 and E108, wherein the edge E104 is created between the at least one data node D0 and the at least one model node M. The context data node D1 influences the at least one model node M and creates an edge E106. The edge E108 is created between the at least one model node M and output from the at least one data node D3. The inference output data node D3 and the condition from the at least one data node D2 (also referred to as "condition data node D2") has mutual influence on each other and creates the edge E110. It is further to be noted that the context data node D1 indirectly influences the compute resource node 122, condition data node D2 and output data node D3, similarly the condition data node D2 causes a indirect influence on the input data node D0 and the at least one model node M. The indirect influence may further create virtual edges such as V102, V104, V106, V108 and V110. Further, the at least one data node D0, condition data node D2, output data node D3 and the at least one model node M creates the edges E112, E114, E116 and E118 respectively with the compute resource node122. Further there is another type of edge exist between all the at least one data node, the at least one model node, the compute resource node and the edges created between these three types of nodes. All the details of edge creation, its influence gets stored in the node log (120). These links are illustrated as dotted lines 130, 132, 134, 136, 138, 140, 142, 144 and 146. The edge details along with the influence created that are stored in the node log facilitates the scoring of different types of nodes. In yet another embodiment of the present invention, there are more than one input data node, context data node, condition data node, model node, output data node and compute resource node. According to another embodiment of the invention, multiple systems as explained above is implemented to rank the data nodes, model nodes and compute resource nodes.

Figure 5:
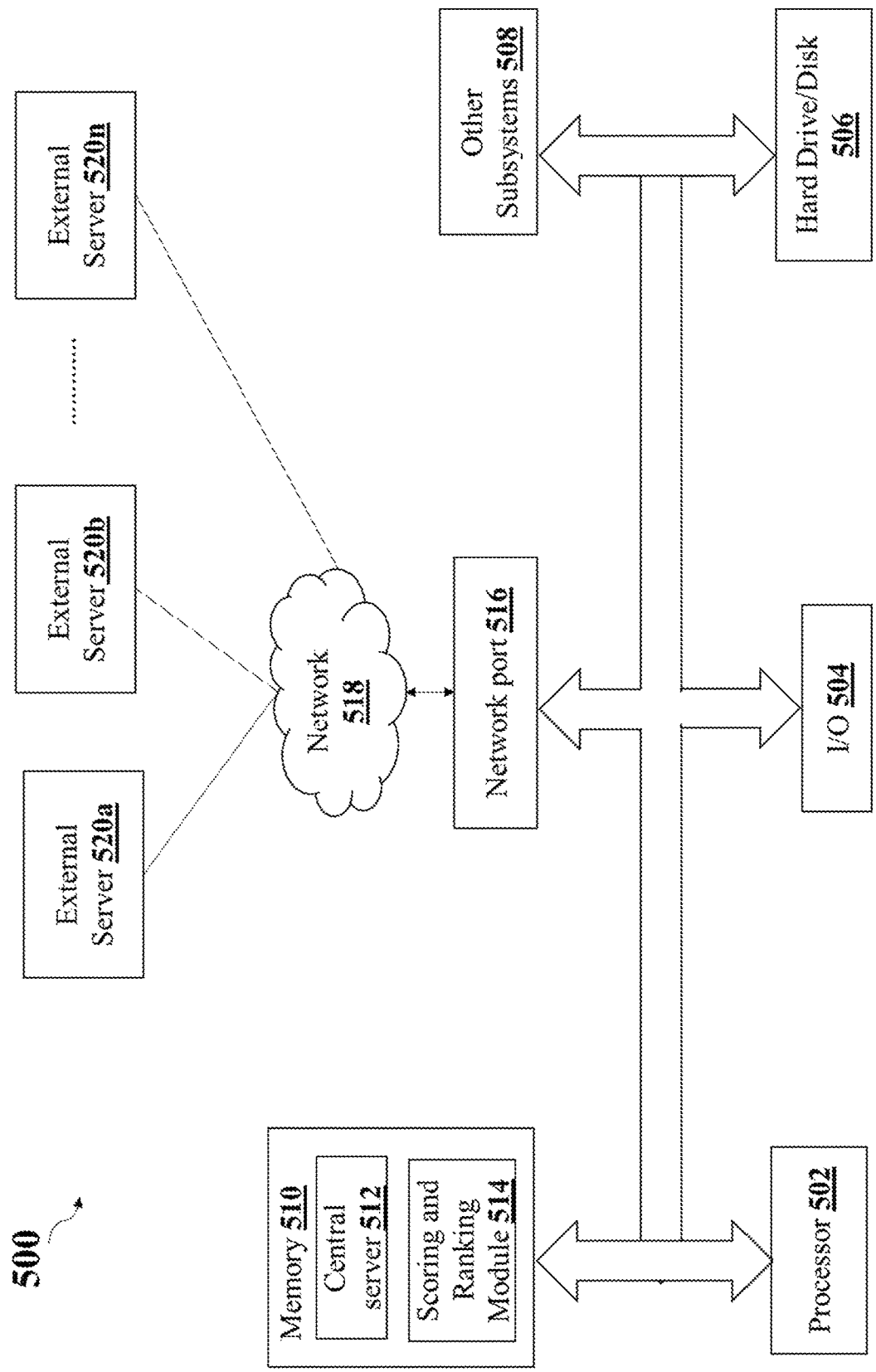
FIG. 5 illustrates an exemplary network environment for implementing the system and method for ranking, in accordance with an embodiment of the present invention.

FIG. 5 illustrates an exemplary network environment 500 for implementing the system and method for ranking, in accordance with an embodiment of the present invention. The network environment 500 includes a processor 502, an input/output device 504, a hard drive or hard disk storage 506 and various other subsystems 508, wherein the various subsystems facilitates the functioning of the entire system. The input/out device may include but is not limited to display, a touchscreen, a mouse and associated controllers for the input/output devices. The network environment 500 also includes the memory 510 of the system, which further includes an operating system (not illustrated in FIG. 5) and a central server 512 and the scoring and ranking module 514. The network environment 500 further includes the network port 516, which facilitates the connection of the above-mentioned components into the network 518. The network 518 helps in connecting the system to the various external servers such as 520a, 520b, 520n that also contains the data nodes that need to be scored and ranked. In an embodiment of the present invention, the scoring and ranking module 514 interacts with the external server (520a, 520b, 520n) to score and rank the nodes present in the external server (520a, 520b, 520n).

Figure 6:
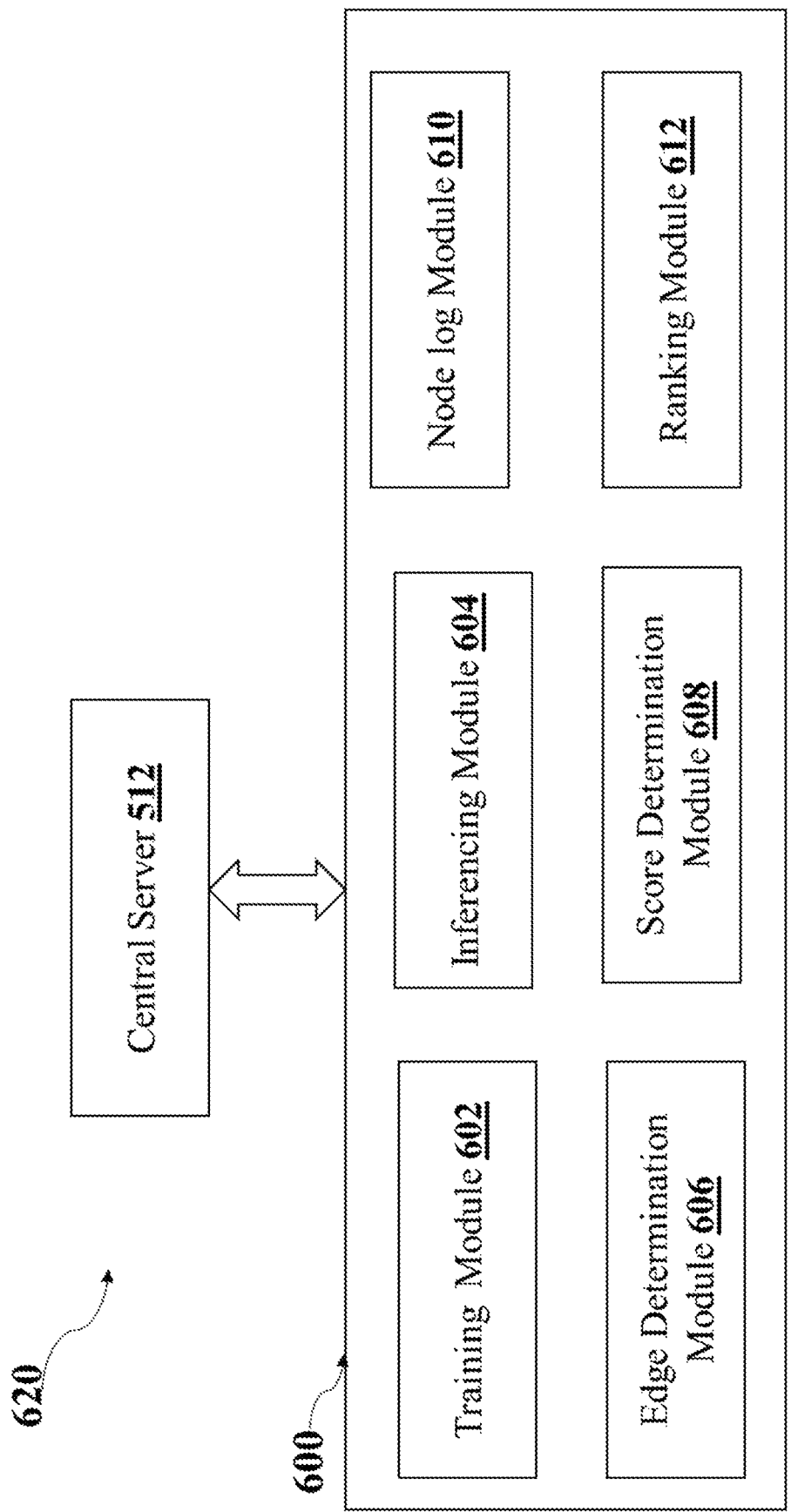
FIG. 6 illustrates an exemplary scoring and ranking module for implementing the system and method for ranking different types of nodes, in accordance with an embodiment of the present invention.

FIG. 6 illustrates an exemplary scoring and ranking module 600 for implementing the system and method for ranking different types of nodes 620, in accordance with an embodiment of the present invention. As used herein the term node may be denote a data node, a model node, or a compute resource node. The scoring and ranking module 600 includes a training module 602, wherein the training module 602 receives at least one model from a central server 512 to form at least one model node. The at least one model node is trained with at least one data node to generate a trained model. A weight is generated from each of the at least one data node for the trained model and transfers the weight generated for the trained model from the at least one data node to the central server 512. The scoring and ranking module (600) further includes an inferencing module (604) to generate an inference output from the at least one input data node using the trained model. The scoring and ranking module (600) further includes an edge determination module (606) to determine an edge between the at least one data node and the at least one model node, wherein the edge is determined depending on the influence of the at least one data node or the at least one model node on each other in generating the trained model and the inference output. The scoring and ranking module (600) further includes a score determination module (608) to determine a score for the at least one data node and the at least one model based on the edge formed. The scoring and ranking module (600) further includes a node log module (610) to capture the details of every edge formed and its relationship between the at least one data node or the at least one mode node or the at least one compute resource node and the edge for a predetermined period until the indexing happens. The node log module (610) captures details of every edge formed and its relationship between the at least one data node and the edge in a database table in a distributed system to figure out distributed learning along with log and enables scoring nodes locally based on the log. The node log module (610) includes meta-data of edges and nodes i.e. the at least one data node, at least one model node or about at least one compute resource node. The node log module (610) further enables tracking of the new edges formed and how the score of each node keeps changing. Hence, the data store by the node log module (610) over a period may be utilized for the global scoring of the at least one data node, at least one model node or the at least one compute resource node over entire network. The ranking module (612) utilizes the data from the node log module to generate the global ranking for the nodes. Typically, the node log data may be stored locally or in the cloud or in the central server.

According to another embodiment of the present invention, the ranking is done for a set of nodes such as at least one data node, at least one model node or at least one compute resource node in one system. In yet another embodiment of the present invention, the ranking is done for a plurality of systems as mentioned above is ranked further to generate overall ranking of various such systems in a network. Typically, this helps the user to select the required data or model present in a network.

Figure 7:
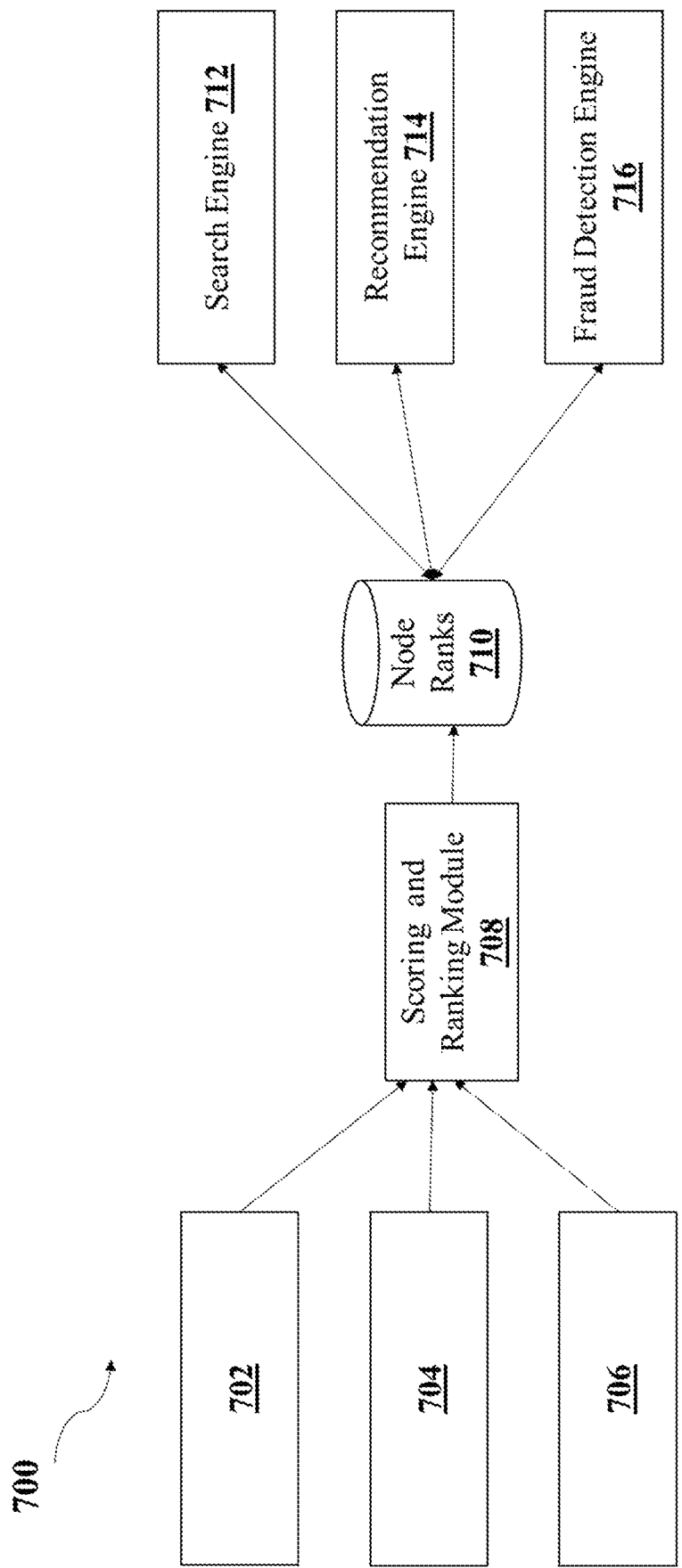
FIG. 7 illustrates an exemplary system and method for ranking nodes, in accordance with an embodiment of the present invention.

FIG. 7 illustrates an exemplary system and method for ranking nodes 700, in accordance with an embodiment of the present invention. As shown in FIG. 7 a number of node logs such as node logs 702, 704, 706 receive log from various nodes (not depicted in the FIG. 7). In one embodiment of the present invention the nodes could be data node, model node, compute resource node. The input from the nodes are used by the scoring and ranking module 708 to generate a score for the nodes and subsequently ranking the nodes. In an embodiment of the present invention, a seed score may be provided to begin the ranking. Once the nodes are ranked, these ranks are stored in database node ranks 710. The ranks stored in the node ranks 710 is utilized by a variety of applications such as search engine 712, recommendation engine 714, fraud detection engine 716 or any such application which can utilize the ranks generated for the nodes.

Figure 8:
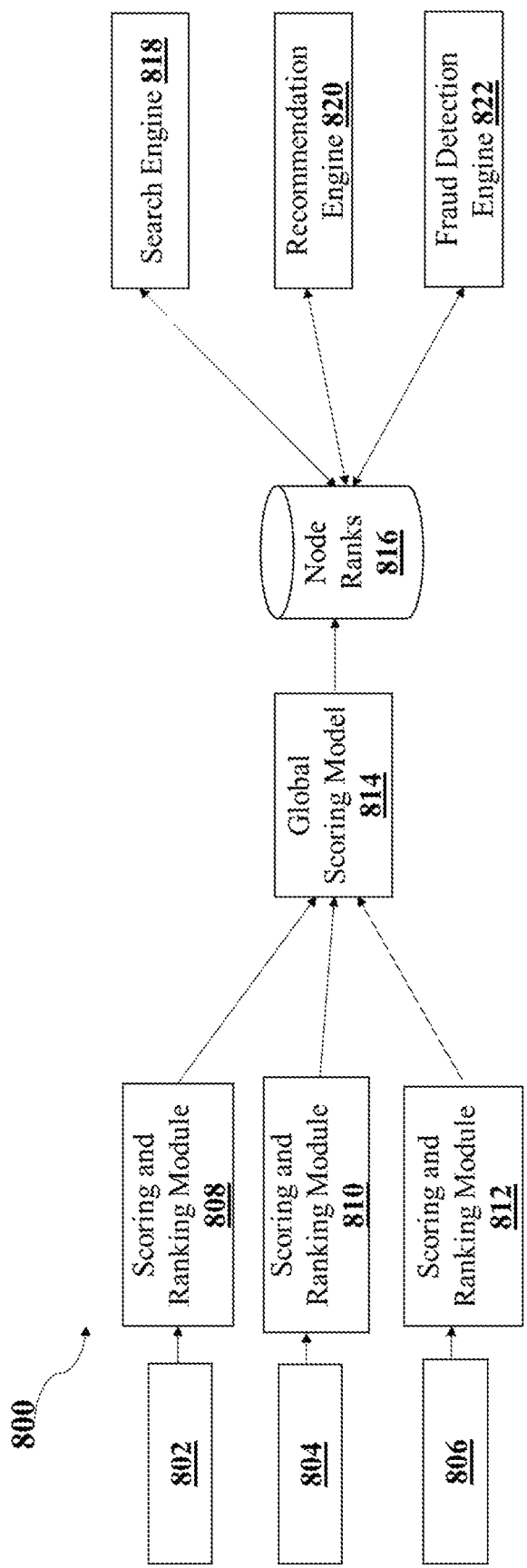
FIG. 8 illustrates an exemplary system and method for ranking nodes, in accordance with an embodiment of the present invention.

FIG. 8 illustrates an exemplary system and method for ranking nodes 800 with a number of node logs, in accordance with an embodiment of the present invention. As shown in FIG. 8, the node logs such as 802, 804 and 806 receive the logs from various nodes (not depicted in the FIG. 7). Each of these node logs are associated with a corresponding scoring and ranking module such as scoring and ranking modules 808, 810 and 812. The log data from the node log 802 is utilized by the corresponding scoring and ranking module 808 to generate the rank for the nodes corresponding to the node log 802.

Whereas the node log 804 is utilized by the corresponding scoring and ranking module 810 to generate the rank for the nodes corresponding to the node log 804. In addition, the node log 806 is utilized by the corresponding scoring and ranking module 812 to generate the rank for the nodes corresponding to the node log 806. The output generated by each of the scoring and ranking modules 808, 810 and 812 are utilized by a global scoring module 814 to generate a global scoring. The global scoring generated by the global scoring module 814 is stored in node rank 816. The ranks stored in the node rank 816 is utilized by a variety of applications such as search engine 818, recommendation engine 816, fraud detection engine 822 or any such application which can utilize the ranks generated for the nodes.

According to another embodiment of the present invention, the step of ranking is done for multiple instance. In every round of indexing the network, weighted score of each node is assigned to all the other connected and participating nodes (where edges are formed) and then ranked based on the new aggregated score. In another embodiment of the present invention, the weights is determined based on the node, edge-type and edge-context [frequency of edge formation, duration (setup time and until the edge lasted), similar nodes and edges present/accessed (local/sub-graphs), data/model refresh rate, etc.] and tuning some of these parameters also help in optimizing the score and subsequently rank. Typically, a seed score may be provided to a node to begin the ranking. Here the node includes at least one data node, at least one model node or at least one compute resource node.

According to another embodiment, the system or method for ranking helps in real time data and AI model pricing. In yet another embodiment of the present invention, the system or method for ranking helps in developing a search engine for a distributed and private data and model. In yet another embodiment of the present invention, the system or method for ranking helps in searching encrypted data. In yet another embodiment, the system or method for ranking helps in providing a multi-party data and an AI based developer/data science platform as a service for example data market or model market or compute resource market. In yet another embodiment, the system or method for ranking enables an automated strategic partnership/alliance-building platform around the data and the AI. In yet another embodiment, the present invention enables a fraud/spam detection in a private data network based on pattern matching.

The foregoing description of the preferred embodiment of the present invention has been presented for the purpose of illustration and description. It is not intended to be exhaustive or to limit the invention to the precise form disclosed. Furthermore, all examples recited herein are principally intended expressly to be only for pedagogical purposes to aid the reader in understanding the principles of the present subject matter and are to be construed as being without limitation to such specifically recited examples and conditions. Many modifications and variations are possible in light of the above teachings.

What is claimed is:

1. A method for ranking comprising:
receiving, at least one model from a central server to form at least one model node;
training, the at least one model node with at least one data node to generate a trained model;
generating, a weight from each of the at least one data node for the trained model;
transferring, the weight from the at least one data node to the central server;
inferencing, an inference output using the trained model and the at least one data node;
determining, an edge between the at least one data node and the at least one model node, wherein the edge is determined depending on the influence of the at least one data node or the at least one model node on each other in generating the trained model and the inference output;
a score for the at least one data node and the at least one model node based on the edge formed, wherein the at least one model node is the trained model or an inferenced model.

2. The method of claim 1, further comprising the step of storing a node log to track the score determined for the at least one data node and the at least one model node.

3. The method of claim 1, further comprising the step of ranking the at least one data node and the at least one model node based on the score.

4. The method of claim 1, further comprising the step of generating an aggregated model comprising at least one of the weight of the at least one of the trained model.

5. The method of claim 1,
wherein the score for the at least one data node and the trained model based on the edge depends on a score factor,
wherein the score factor comprises at least one of an AI readiness, a damping factor, a frequency of usage of the at least one data node or an association to an influential node.

6. The method of claim 1, further comprising the step of scoring at least one compute resource node associated with the at least one model node and the at least one data node based on the score determined for the at least one model node and the at least one data node.

7. A system for ranking, the system comprising:
at least one processor; and
a memory coupled to the processors comprising instructions executable by the processors, the processors being operable when executing the instructions to:
receive at least one model from a central server to form at least one model node;
train the at least one model node with at least one data node to generate a trained model;
generate a weight from each of the at least one data node for the trained model;
transfer the weight from the at least one data node to the central server;
inference an inference output using the trained model and the at least one data node;
determine an edge between the at least one data node and the at least one model node, wherein the edge is determined depending on the influence of the at least one data node or model node on each other in generating the trained model and the inference output; and
determine a score for the at least one data node and the at least one model node based on the edge formed, wherein the at least one model node is a trained model or inferenced model.

8. The system of claim 7, further comprising a node log module to store a node log to track the score determined for the at least one data node and the at least one model node along with the edges formed.

9. The system of claim 7, of further comprising a ranking module to rank the at least one data node and the trained model based on the score.

* * * * *